(12) United States Patent
Schaller

(10) Patent No.: US 12,284,441 B2
(45) Date of Patent: Apr. 22, 2025

(54) CAMERA STABILIZATION ARRANGEMENT

(71) Applicant: Arnold & Richter Cine Technik GmbH & Co. Betriebs KG, Munich (DE)

(72) Inventor: Curt Schaller, Munich (DE)

(73) Assignee: Arnold & Richter Cine Technik GmbH & co. Betriebs KG, Munich (DE)

( * ) Notice: Subject to any disclaimer, the term of this patent is extended or adjusted under 35 U.S.C. 154(b) by 131 days.

(21) Appl. No.: 18/106,698

(22) Filed: Feb. 7, 2023

(65) Prior Publication Data

US 2023/0269473 A1 Aug. 24, 2023

(30) Foreign Application Priority Data

Feb. 23, 2022 (DE) .......................... 102022104329.0

(51) Int. Cl.
*H04N 5/335* (2011.01)
*H04N 23/51* (2023.01)
*H04N 23/68* (2023.01)

(52) U.S. Cl.
CPC ........... *H04N 23/685* (2023.01); *H04N 23/51* (2023.01); *H04N 23/6812* (2023.01)

(58) Field of Classification Search
CPC ................................................... H04N 23/685
See application file for complete search history.

(56) References Cited

U.S. PATENT DOCUMENTS

| 4,774,589 A | 9/1988 | Rowland |
| 5,963,749 A | 10/1999 | Nicholson |
| 7,642,741 B2 | 1/2010 | Sidman |
| 8,036,937 B2 | 10/2011 | Tang et al. |
| 10,491,824 B2 | 11/2019 | Enke et al. |
| 2012/0019660 A1 | 1/2012 | Golan et al. |
| 2019/0098191 A1 | 3/2019 | Enke et al. |
| 2019/0182424 A1 | 6/2019 | Omari et al. |
| 2020/0036899 A1 | 1/2020 | Tanaka et al. |

(Continued)

FOREIGN PATENT DOCUMENTS

| DE | 102012107265 A1 | 2/2014 |
| DE | 102015107483 A1 | 11/2016 |
| DE | 202018105518 U1 | 5/2019 |

(Continued)

OTHER PUBLICATIONS

German Patent and Trademark Office Communication issued in Application No. DE 20 2018 105 518 U1, dated Sep. 15, 2022, No translation provided.

(Continued)

*Primary Examiner* — Gary C Vieaux

(74) *Attorney, Agent, or Firm* — Amster, Rothstein & Ebenstein LLP

(57) ABSTRACT

In a camera stabilization arrangement having a camera holder movable with respect to a plurality of degrees of freedom, an electric drive for the camera holder, an electronic camera fastened to the camera holder and a motion sensor, a control device is configured to control the electric drive in response to motion sensor signals from the motion sensor in order to perform a holder-side image stabilization, and to control an image capturing device of the camera in order to perform a camera-side image stabilization.

20 Claims, 4 Drawing Sheets

(56) References Cited

U.S. PATENT DOCUMENTS

2021/0223669 A1\* 7/2021 Liao .................. G03B 5/02
2021/0314491 A1\* 10/2021 Sakurai ............. H04N 23/687

FOREIGN PATENT DOCUMENTS

| EP | 0667708 A1 | 8/1995 |
| JP | 6972458 B1 | 11/2021 |
| WO | 2014058511 A2 | 4/2014 |

OTHER PUBLICATIONS

European Patent Office Extended search report issued in Application No. 23155073.2, dated Jul. 14, 2023, No translation provided.
European Examination Report issued in Application No. 12155073.2, dated Jan. 23, 2025.

\* cited by examiner

CAMERA STABILIZATION ARRANGEMENT

The present invention relates to a camera stabilization arrangement having a movable camera holder and an electronic camera fastened to the camera holder.

Such a camera stabilization arrangement may be used, in particular for a recording of moving image sequences, for example a scene of a motion picture film, to achieve a stabilization of the recorded image content with respect to disturbing influences on account of unwanted or unintended movements of the camera. Image stabilization is especially important when the camera is moved to different positions during the recording, for example, when a camera operator carries the camera on his body via a support structure or when the camera is fastened to a crane, a vehicle or the like. Such an image stabilization may be applied to a still image camera, however, for a motion picture camera in particular, it is especially important.

Such camera stabilization arrangements are known, for example, from U.S. Pat. No. 5,963,749 A, DE 10 2012 107 265 A1 and DE 10 2015 107 483 A1, to which reference is made with regards to various possible embodiments of camera stabilization arrangements.

A problem with the known camera stabilization arrangements, is that not all the occurring disturbing influences to the alignment of the camera are equally well compensated for. In some cases, disturbing influences may even be undesirably overcompensated.

It is the object of the invention to present a camera stabilization arrangement that provides an improved image stabilization with respect to various disturbing influences on the alignment of the camera.

This object is achieved by a camera stabilization arrangement having the features of claim 1.

The camera stabilization arrangement comprises a camera holder to which the camera is fastened, in particular rigidly fastened. The camera holder is movable, in particular, movable in itself and/or movably supported to a support structure. The camera holder may comprise, for example, a plurality of elements that are movable relative to each other (e.g. an outer frame and an inner frame movably supported in the outer frame). The support structure may comprise, for example, a so-called rig, a pendulum arm or a pivot arm. The camera holder and the associated support structure may form, for example, a so-called gimbal. The movability of the camera holder may take place according to translational (i.e. linear) degrees of freedom (for example, when using a cardan joint) and/or rotational degrees of freedom (for example, when using a ring bearing). An electric drive which can be controlled, is able to drive the camera holder—and thus the camera fastened to it—according to the degrees of freedom. For this purpose, the electric drive may comprise, for example, one or more electric motors. Thus, the electric drive may effect movement of various elements of the camera holder relative to each other and/or movement of the camera holder relative to a support structure. Thus, the electric drive may in particular enable, in accordance with a user command, the camera holder or an element of the camera holder—and thus the camera fastened thereto—to be actively moved in a desired direction by a desired amount in order to electromotively perform a camera pan or tilt movement, for example.

The camera may in particular be a motion picture camera. The camera comprises an image capturing device, which has at least one electronic image sensor for generating image sensor signals in dependence of incident light. The image sensor may comprise a two-dimensional matrix of light-sensitive elements in CMOS or CCD technology, for example. The camera's image capturing device may comprise further components, in particular at least one optical component, as will be further explained below.

The camera stabilization arrangement further comprises at least one motion sensor that detects movements of the camera holder in multiple directions—and thus of the camera fastened thereto—and generates corresponding motion sensor signals. For this purpose, a plurality of motion sensors may be provided which may be arranged at different elements of the camera holder and/or the camera (in particular, also within the camera). The respective motion sensor may have, for example, a static or dynamic acceleration sensor, in particular a multi-axis type of acceleration sensor.

The camera stabilization arrangement further comprises a control device configured to control the electric drive in response to the motion sensor signals generated by the motion sensor(s) in order to perform holder-side image stabilization, and to also control the image capturing device in response to the motion sensor signals in order to perform camera-side image stabilization. Thus, on the one hand, image stabilization is performed via the camera holder in that the camera holder is driven in order to compensate for outer disturbing influences to the alignment of the camera (as an electromechanical image stabilization). For the holder-side image stabilization, the control device controls the electric drive in such a way that the camera holder is driven to make compensating movements opposite in direction and by a corresponding amount for at least some of the detected movements. On the other hand, the control device also brings about image stabilization to the image capturing device of the camera (as an electronic and/or electromechanical image stabilization).

Due to the possibility of carrying out image stabilization on the holder side and image stabilization on the camera side and coordinating these with each other, various types of disturbancing influences and/or different states of the camera stabilization arrangement may be responded to differently, in order to perform either holder-side image stabilization or camera-side image stabilization or a combination thereof. This ensures optimized image stabilization for various disturbing influences and/or different states of the camera stabilization arrangement. Since both the holder-side image stabilization and the camera-side image stabilization are based on the same motion sensor signals, a precise coordination of the holder-side image stabilization and the camera-side image stabilization with each other is possible.

Where reference is made in connection with the invention to an alignment (i.e. orientation) of the camera holder or to electrically driving the camera holder, this refers also to entirely individual elements of the camera holder, if the camera holder comprises a plurality of elements movable relative to one another.

The control device of the camera stabilization arrangement may comprise a single physical unit. However, the control device of the camera stabilization arrangement may also comprise a plurality of sub-units, wherein, for example, a first control circuit is assigned to the camera holder and the electric drive, and a second control circuit is assigned to the image capturing device of the camera. The second control circuit, for example, may also be part of a control unit of the camera. The first control circuit and the second control circuit may be physically separate and may, however, be connected in particular by signals to each other. At least one of the control circuits, or both the first control circuit and the second control circuit, may be technically connected by signals to the at least one motion sensor. The control device (or the first control circuit and the second control circuit) may include, for example, one or more of the following devices: an integrated circuit (IC), a microprocessor, a central processing unit (CPU), an application specific integrated circuit (ASIC), or a field programmable gate array (FPGA).

Further embodiments of the invention are explained below.

In some embodiments, the control device is configured to distinguish between at least one (so-called) holder-compensation-suitable type of detected movements and at least one (so-called) holder-compensation-unsuitable type of detected movements. A respective holder-compensation-suitable type of detected movements or holder-compensation-unsuitable type of detected movements may be predetermined and in particular may be stored as a fixed attribute of a type of movement (e.g. movement direction, movement amount and/or movement pattern), for example, in a non-volatile memory (e.g. EEPROM, flash EEPROM) assigned to the control device. Alternatively, for a respective holder-compensation-suitable type of detected movements or holder-compensation-unsuitable type of detected movements, determination parameters may be predetermined and in particular stored, and from which, the control device may variably determine the distinction between a holder-compensation-suitable type and a holder-compensation-suitable type of detected movements depending on the situation, for such an embodiment, the distinction may be made, for example, in dependence of a current position setting of the electric drive and/or in dependence of a current alignment of the camera holder, as will be explained below.

The control device causes the electric drive of the camera holder to perform the holder-side image stabilization only for the at least one holder-compensation-suitable type of detected movements, but not to perform the holder-side image stabilization for the at least one holder-compensation-unsuitable type of detected movements. In contrast, the control device causes the image capturing device to perform the camera-side image stabilization for the at least one holder-compensation-unsuitable type of detected movements. It is not excluded, that the control device—in addition to the holder-side image stabilization—controls the image capturing device to perform the camera-side image stabilization also for the at least one holder-compensation-suitable type of detected movements. Thus, the possibilities of image stabilization made available may be used optimally.

The at least one holder-compensation-suitable type of detected movements may include, for example, a detected rotational movement of the camera holder and/or the camera. Alternatively or additionally, the at least one holder-compensation-unsuitable type of detected movements may include, for example, a detected translational movement of the camera holder and/or the camera. The respective rotational movement or translational movement of the camera holder and/or the camera may relate in particular to a plane of movement corresponding to the plane of extension of the image sensor (i.e. a plane of movement perpendicular to the optical axis of the camera). The identification of a detected movement as a holder-compensation-suitable rotational movement or as a holder-compensation-unsuitable translational movement may also refer respectively to only one movement component of the detected movements. Thus, through the control device, simple and quick verifiable criteria are available for an identification of a holder-compensation-suitable type of detected movements or a holder-compensation-unsuitable type of detected movements.

In particular, the control device may be configured to determine the at least one holder-compensation-unsuitable type of detected movements—as already mentioned—in dependence of a current position setting of the electric drive and/or in dependence of a current alignment of the camera holder. As a result, consideration may be given as to how well suited the available degrees of freedom of the electric drive are for compensation movements of the camera holder. The control device may determine the current position setting of the electric drive, for example, from a target value of the control of the electric drive or from an actual value, which is determined by means of at least one position sensor. In particular, the current position setting of the electric drive may also include a relative position of two or more elements of the electric drive or may enable the determination of such a relative position. Furthermore, the current position setting of the electric drive may allow conclusions to be drawn as to which extent a compensation movement of the camera holder or individual elements thereof is still possible, for example before a physical stop is reached. The same applies with regard to the current alignment of the camera holder. The current alignment of the camera holder in space, i.e. the alignment of the camera holder relative to the direction of gravity, may be detected by the at least one movement sensor and/or by additional sensors.

Knowledge of the current alignment of the camera holder may be used by the control device to evaluate whether a compensation movement of the camera holder may be performed by means of the electric drive to counteract the detected movements. This is (dependent on the degrees of freedom of the electric drive), namely, not always possible or not always possible in a suitable way. Thus, the control device may be configured to variably assign the detected movements to a holder-compensation-suitable type or a holder-compensation-unsuitable type depending on the situation, and to select the holder-side image stabilization and/or the camera-side image stabilization according to this assignment or (in the case of a combination) to weigh them relative to each other.

Additionally or alternatively to the distinctions explained above, the control device may be configured to perform the holder-side image stabilization for at least one of the plurality of directions of the detected movements (in particular, for some or all of the plurality of directions) only if a frequency of the detected movements is less than a first threshold value, and to perform the camera-side image stabilization for the respective direction(s) only if the frequency of the detected movements is greater than a second threshold value. For such embodiments, the control device may evaluate the detected movements with regards to a frequency. In the present context, the term frequency is to be understood broadly and includes the inverse of a time duration that may be assigned to a movement in a first direction and a subsequent movement in a direction opposite to the first direction. The frequency of a detected movement may be estimated already based on the speed of a detected movement. As soon as a movement in the opposite direction occurs, the frequency of the detected movement may be estimated even more accurately. As soon as a reversal of direction occurs again, the frequency may be determined already with sufficient accuracy. Such evaluations may be carried out separately or also in combination with each other for different spatial directions of the detected movements Depending on a determined frequency of a detected movement, the control device may then differentiate whether the holder-side image stabilization and/or the camera-side image stabilization is to be performed. For this purpose, a first threshold value of the determined frequency may be taken into account. If the determined frequency is less than the first threshold value, the holder-side image stabilization is considered suitable. If, on the other hand, the determined frequency is greater than a second threshold value, the camera-side image stabilization is considered suitable. This takes into account that the camera-side image stabilization may be performed, for example, electronically (in particular, by a so-called pixel shift, as will be explained below) or electromechanically with relatively small masses to be driven (in particular, by a piezo drive, as will be explained below) and is thus particularly well suited for the high frequencies of the disturbing influences or the detected movements.

In some embodiments, the first threshold value and the second threshold value may be selected to be identical. Thus, the first threshold value and the second threshold value form a common threshold value for selecting either the holder-side image stabilization or the camera-side image stabilization.

In other embodiments, the first threshold value may be selected to be less than the second threshold value, wherein the first threshold value and the second threshold value bound a transition frequency range in which the control device performs both the holder-side image stabilization and the camera-side image stabilization. In such embodiments, the control device may thus bring about both the holder-side image stabilization and the camera-side image stabilization if the frequency of the detected movements determined for a respective direction of the detected movements lies between the (lower) first threshold value and the (higher) second threshold value. In the transition frequency range, a continuous transition between the holder-side image stabilization and the camera-side image stabilization may be provided, for example.

As discussed above, in some embodiments, the control device may be configured to perform the holder-side image stabilization for some (in particular, all) of the plurality of directions of the detected movements only when a frequency of the detected movements is less than a first threshold value, and to perform the camera-side image stabilization for the corresponding directions only when the frequency of the detected movements is greater than a second threshold value. In such embodiments, the control device may be furthermore configured to perform the holder-side image stabilization for different ones of the plurality of (spatial) directions of the movements in dependence of different first threshold values. Alternatively or additionally, the control device may be configured to perform the camera-side image stabilization for different ones of the plurality of (spatial) directions of the movements in dependence of different second threshold values.

Thus, with regard to the threshold values for the determined frequencies of the detected movements, additionally a differentiation may be made according to different directions (i.e. alignments in space), for example according to the horizontal or the vertical direction. Thus, for different directions, different threshold values of the transition between the holder-side image stabilization and the camera-side image stabilization may be provided. As a result, by means of a simple differentiation criterion, it may be considered, that one of the two available types of image stabilization is not alone better suited than the other type of image stabilization with regards to a frequency of the disturbing influences, but rather, this may also depend on a direction of the respective disturbance (in particular, according to the degrees of freedom of the electric drive of the camera holder).

In some embodiments, the camera stabilization arrangement may comprise an input device which is configured to receive user commands for a desired movement of the camera holder. Such an input device may comprise, for example, a control stick (joystick), a rocker, or a rotary wheel. The control device may be configured to control the electric drive in response to a received user command to change an alignment of the camera holder. Thus, by operating the input device the user (e.g. camera operator) may actively move the camera holder and therefore the camera to perform a camera pan or a tilt movement, for example. In such embodiments, the control device may be configured to suspend (i.e. suppress) or modify the camera-side image stabilization in response to the received user command.

Thus, if it is known already that a desired movement of the camera holder is taking place due to an active control of the electric drive, motion sensor signals from the motion sensor(s) may be deliberately ignored or only considered to a limited extent. A typical application is, for example, a camera pan in which the onset change in the horizontal alignment of the camera is not to be suppressed or delayed by the camera-side image stabilization (avoidance of a so-called slip stick effect). In this case, the camera-side image stabilization may be suspended or modified at least for that direction of a detected movement which corresponds to a direction of the received user command and/or the correspondingly performed drive movement of the camera holder. In the case of the suspension of the camera-side image stabilization, camera-side image stabilization does not take place (e.g. no pixel shift). In the case of modifying the camera-side image stabilization, the camera-side image stabilization may be performed in a reduced manner and/or performed in a direction-selective manner, for example. A reduced camera-side image stabilization means that it is performed to a lesser extent than in an operation of the camera stabilization arrangement not having a received and executed user command.

Alternatively or additionally, the camera stabilization arrangement may comprise at least one position sensor which is configured to generate a position signal which represents a change in the position of the camera holder manually effected by the user. This position change may relate to a movement of the camera holder relative to a support structure of the camera stabilization arrangement (e.g. rig, pendulum arm, pivot arm, or tripod) manually effected by a user, and/or to a movement of different elements of the camera holder relative to each other manually effected by a user. The position sensor may comprise, for example, a rotary encoder (e.g. as an incremental encoder or as an absolute encoder). In such embodiments, the control device may be configured to suspend or modify the camera-side image stabilization in response to the position signal from the position sensor. Thus, if it is known that a desired movement of the camera is taking place based on a manual movement of the camera holder (including its various elements), motion sensor signals from the motion sensor(s) may be deliberately ignored or only taken into account to a limited extent. In this case, the camera-side image stabilization may be suspended or modified at least for that direction of a detected movement which corresponds to a direction of the manually performed movement, as explained above in connection with a received user command. Thus, also in the case of a manual change in the alignment of the camera, the explained slip stick effect may be prevented, for example.

In some embodiments, the control device may be configured to thereupon evaluate the motion sensor signals as to whether a predetermined movement pattern may be identified from the horizontal and/or vertical movements. Such a movement pattern may be stored, for example, in a non-volatile memory associated with the control device. The predetermined movement pattern may include, for example, a horizontal pendulum motion, i.e. a periodic horizontal back-and-forth motion that may typically occur during a walking movement of a camera operator carrying the camera stabilization arrangement including the camera. For this purpose, the motion sensor signals may be categorized, for example, according to direction and speed of movement and associated time durations, wherein these values are compared to reference values of typical movement patterns. In such embodiments, the control device may be configured to suspend or modify the holder-side image stabilization for the identified movement pattern. In this way, the holder-side image stabilization (typically performed electromechanically) may be suppressed or reduced intentionally for such movement patterns for which it is already known that the holder-side image stabilization without correction intervention tends to overcompensate the detected movements. In the case of the holder-side image stabilization being suspended, no holder-side image stabilization takes place. In the case of modifying the holder-side image stabilization, the holder-side image stabilization may be performed in a reduced and/or direction-selective manner, for example. A reduced holder-side image stabilization means that due to pattern matching, it is performed to a lesser extent than in an operation of the camera stabilization arrangement without correction intervention.

In some embodiments, the control device may be configured to evaluate the performed holder-side image stabilization or the performed camera-side image stabilization with regards to a quality grade of the image stabilization performed, and to determine a corresponding quality value. This can be done, for example, in that the control device assigns a predetermined individual value (e.g. stored in a table) to a respective measure of the holder-side image stabilization or the camera-side image stabilization, wherein, over a course of time, a plurality of individual values are determined for the performed image stabilization and combined to form the quality value. In some embodiments, the quality value may also be determined as time-dependent, i.e. include a temporal progression. The control device may be furthermore configured to output the quality value to a user interface. The output of the quality value may take place immediately or be delayed (in particular as a result of buffering). The user (e.g. camera operator) may thus perform a test run before recording a moving image sequence and based on the determined and output quality grade, decide whether improvements with regard to camera guidance appear to be useful or necessary.

In some embodiments, the camera may be configured to output and/or store moving image data during a recording of a moving image sequence (i.e. a film scene), wherein the control device is configured to assign, during the recording of the moving image sequence, at least part of the motion sensor signals and/or information about the performed image stabilization as metadata to the moving image data. The information about the performed image stabilization may be compiled in a predetermined data format by the control device, for example as a time-coded progression of direction values and magnitude values of the performed image stabilization on the holder side and/or the camera side. The motion sensor signals and/or information about the performed image stabilization may thus be output and/or stored together with the moving image data (in particular, embedded in the moving image data). It is thus possible to subsequently (in particular, in so-called post production) analyze and/or correct (in the sense of an increase or reduction) the image stabilization that has been performed.

As regards the holder-side image stabilization, in some embodiments, the electric drive of the camera holder may comprise at least one electric motor. For example, a stepper motor or a servo motor may be used as the respective electric motor, in particular with an integrated reduction gear and/or with an integrated position control. In some embodiments, a first electric motor may be provided to drive the camera holder relative to a support structure of the camera stabilization arrangement, wherein at least a second electric motor is provided to drive a movable element of the camera holder relative to another element of the camera holder. In some embodiments, electric motors may be provided only for driving different elements of the camera holder relative to one another. The electric motor(s) is/are connected by signal to the control device and may be controlled accordingly by the control device to perform compensation movements for holder-side image stabilization.

With regards to camera-side image stabilization, in some embodiments, the image sensor of the image capturing device may comprise a matrix of light-sensitive elements to generate the image sensor signals. As explained earlier, the image sensor may be manufactured using CMOS or CCD technology, for example. A first number of light-sensitive elements (in particular in a central region of the matrix of light-sensitive elements) may be intended for generating actually used image sensor signals, i.e. image signals which are actually to be used for forming a moving image sequence and thus, are to represent the image content of a moving image sequence, wherein, for this purpose, the image sensor signals concerned are read out or output by the camera and/or stored in the camera or outwith the camera. On the other hand, a second number of light-sensitive elements (in particular at an edge region of the matrix of light-sensitive elements) may not be intended be used for generating actually used image sensor signals. The assignment of the light-sensitive elements to the first number or the second number of light-sensitive elements may be variable for at least a part of the light-sensitive elements. Such a dividing of the matrix of light-sensitive elements is known, for example, from U.S. Pat. No. 8,063,937 B2.

In such embodiments, the control device may be configured to vary the assignment of the light-sensitive elements to the first number or to the second number in response to the motion sensor signals, in order to move a readout field along the matrix of light-sensitive elements and thereby perform the camera-side image stabilization in an electronic manner. In other words, by changing the assignment of the light-sensitive elements to the first number or to the second number, may influence which image sensor signals are to be used for the representation of the image content of, for example, a film scene. By changing the assignment, undesired changes in the alignment of the camera in the horizontal and/or vertical direction (x/y direction) may be compensated (so-called pixel shift).

Alternatively or additionally, in some embodiments, the image sensor may be movably supported, wherein the image capturing device further comprises an image sensor drive device, and wherein the control device is configured to control the image sensor drive device to move the image sensor in response to the motion sensor signals of the motion sensor(s) in order to perform the camera-side image stabilization in an electromechanical manner. Thus, by moving the image sensor, undesired changes in the alignment of the camera in the horizontal and/or vertical direction (x/y direction) may be compensated. The movement of the image sensor may take place in particular along a plane that is perpendicular to the optical axis of the camera. The image sensor drive device may comprise, for example, one or more piezo-actuator(s) or one or more electric motor(s).

Alternatively or additionally, in some embodiments, the image capturing device may furthermore comprise an optical component upstream of and in the optical path of the image sensor and an optical component drive device. The control device may be configured to control the optical component drive device to move the optical component in response to the motion sensor signals of the motion sensor(s), in order to influence the beam path of the incident light and thereby perform the camera-side image stabilization in an electromechanical manner. Thus, by moving the optical component, undesired changes in the alignment of the camera in the horizontal and/or vertical direction (x/y direction) may be compensated.

Movement of the optical component may take place, in particular, along a plane that is perpendicular to the optical axis of the camera. The optical component drive device may comprise, for example, one or more piezo-actuator(s), or one or more electric motor(s).

The invention also relates to a method for controlling a camera stabilization arrangement comprising a camera holder movable with respect to a plurality of degrees of freedom; an electric drive configured to drive the camera holder in accordance with the plurality of degrees of freedom; an electronic camera fastened to the camera holder and comprising an image capturing device; at least one motion sensor configured to detect movements of the camera holder and/or the camera in a plurality of directions and to generate corresponding motion sensor signals; and a control device configured to control the electric drive in response to the motion sensor signals in order to perform holder-side image stabilization, and to control the image capturing device in order to perform camera-side image stabilization; wherein the method includes the control steps explained in connection with the camera stabilization arrangement according to the invention.

The invention is explained below merely by way of example with reference to the drawings. Identical or similar elements are designated therein with the same reference characters.

FIGS. 1 to 3 show parts of a camera stabilization arrangement as already shown and described in the aforementioned published document DE 10 2015 107 483 A1 (a description is reproduced below):

Figure 1:
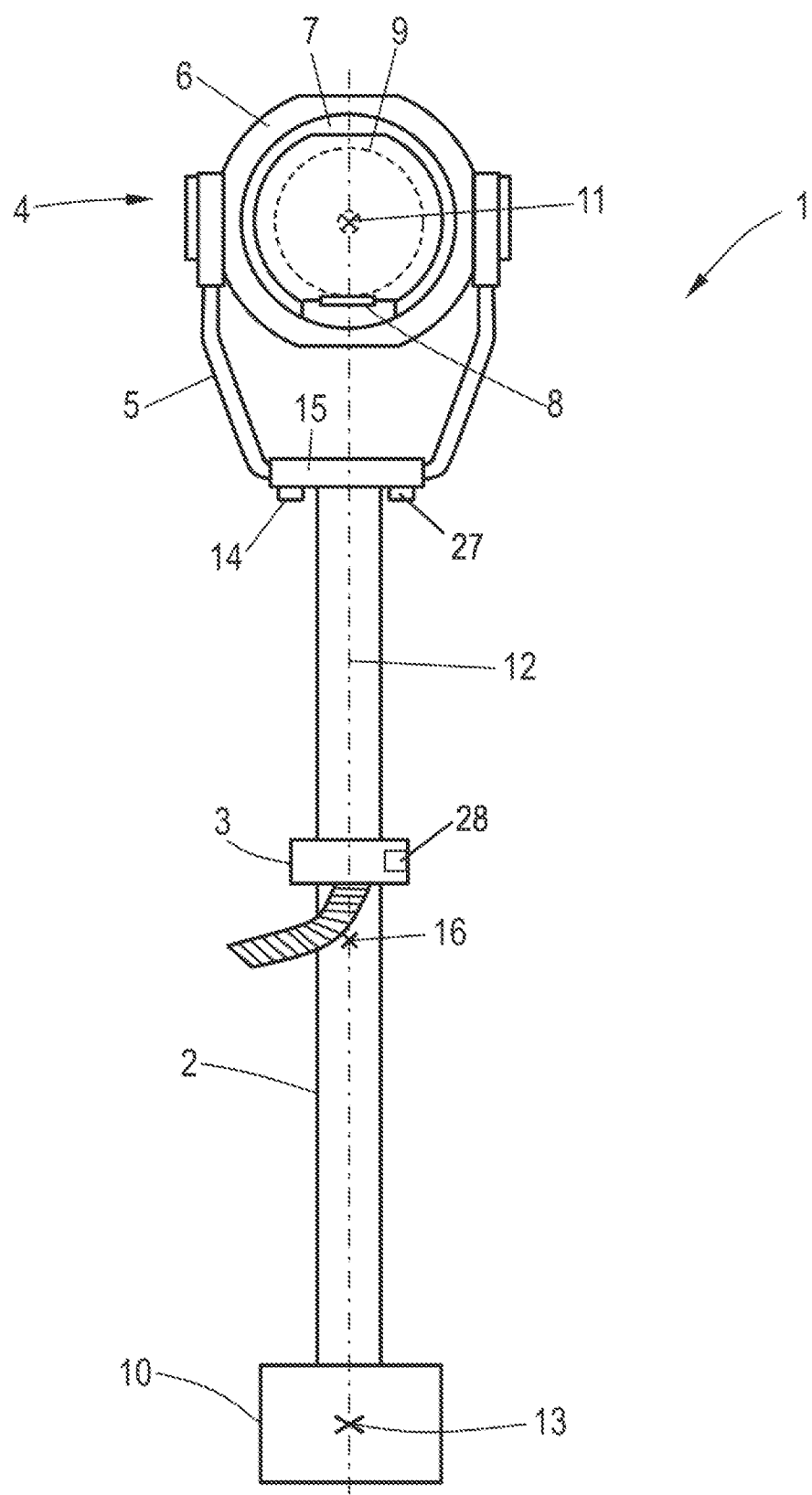
FIG. 1 shows a camera stabilization arrangement.

FIG. 1 shows a partly simplified view of a camera stabilization arrangement 1. This camera stabilization arrangement 1, as is generally known, has a pendulum arm 2 which serves as a supporting structure and which can be connected to a gimbal (not shown in more detail here) via a coupling device 3. The gimbal may be connected to a support arm which is fastened to an article of clothing worn by a person.

A camera holder 4 is arranged at one end of the pendulum arm 2, which will be explained in more detail with respect to FIGS. 2 to 3, and which comprises a holding frame 5 in which two ring elements 6, 7 are supported. The inner, second ring element 7 has a camera fastening device 8 to which a camera 9, only indicated here, has been fastened.

To ensure a balance with respect to the camera holder 4 having the camera 9, a counterweight 10 is provided at the other end of the pendulum arm 2 such that the center of gravity of the camera stabilization arrangement 1 comes to rest in the region of the coupling device 3. The counterweight 10 may be formed, for example, by an energy source, in particular a battery, a monitor and the like such as is generally known. The counterweight 10 is adjustable to set the center of gravity of the camera stabilization arrangement 1, for example, in that the battery or parts of the battery are changeable in their position, mass elements may be added or removed and the like. Furthermore, the coupling device 3 is displaceable along the pendulum arm 2 by means of displacement means not shown in more detail here.

The camera holder 4 is configured such that, on the one hand, the center of gravity of the ring arrangement with the ring elements 6, 7 and the camera 9 lie at the center of the ring elements 6, 7, wherein moreover the center of gravity of the camera holder 4 having the camera 9, not shown in more detail here, and also the center of gravity 11 come to rest on a longitudinal axis 12 of the pendulum arm 2 on which also the center of gravity 13 of the counterweight lies. Lateral deviations of the center of gravity of the camera holder 4 having the camera 9 may be corrected via displaceable mass elements 14 which are arranged beneath a support plate 15 of the holding frame 5. For this purpose, the mass elements 14 are supported in a sliding, but fixable manner in a dovetail-like guide (not shown in more detail here).

Since, in the present case, the camera stabilization arrangement 1 is shown in a vertical alignment in which the camera 9 is arranged at the top, the center of gravity 16 of the camera stabilization arrangement 1, viewed from the coupling device 3, is rather downwardly located towards the counterweight 10, such that a stable vertical position is achieved.

Figure 2:
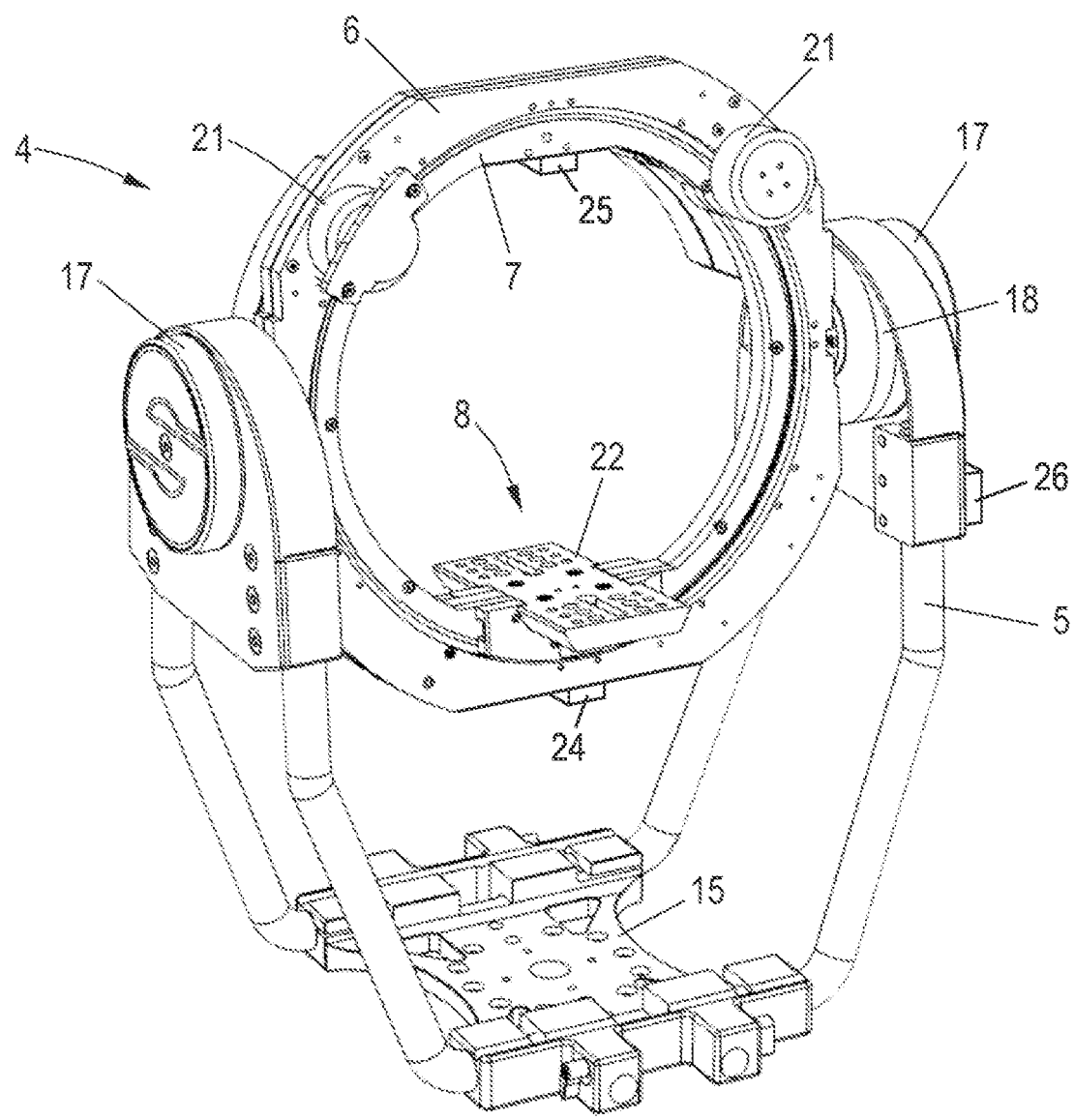
FIG. 2 shows a perspective view of parts of the camera stabilization arrangement according to FIG. 1.

FIG. 2 shows a perspective view of the camera holder 4 which, as already mentioned, comprises the holding frame 5 with the support plate 15, which is symmetrically formed and which can be centrally fastened (fixed or rotatably) to an end of the pendulum arm 2 via corresponding fastening means. Initially, the first, outer ring element 6 is rotatably supported with its outer side in the holding frame 5, wherein drive means 18 are included in the housings 17 shown and allow a controlled rotation of the first ring element 6 about a tilt axis 19 (cf. the front view of FIG. 3). In the housings 17, are further pendulum bodies hinged in an unbalanced manner (not shown) suspended at the shaft for rotation about the tilt axis 19.

The second ring element 7 is again rotatably supported within the first ring element 6, along the inner side (i.e. at the inner periphery) of the first ring element 6, and indeed rotatable about a roll axis 20 (cf. again the front view of FIG. 3) which is at least in parallel with the image axis of the camera 9. A ball bearing, not shown in more detail here, is used for rotatably supporting the ring element 7 in the ring element 6. A rotation of the second ring element 7 in the first ring element 6 may also be obtained by corresponding drive means 21.

Figure 3:
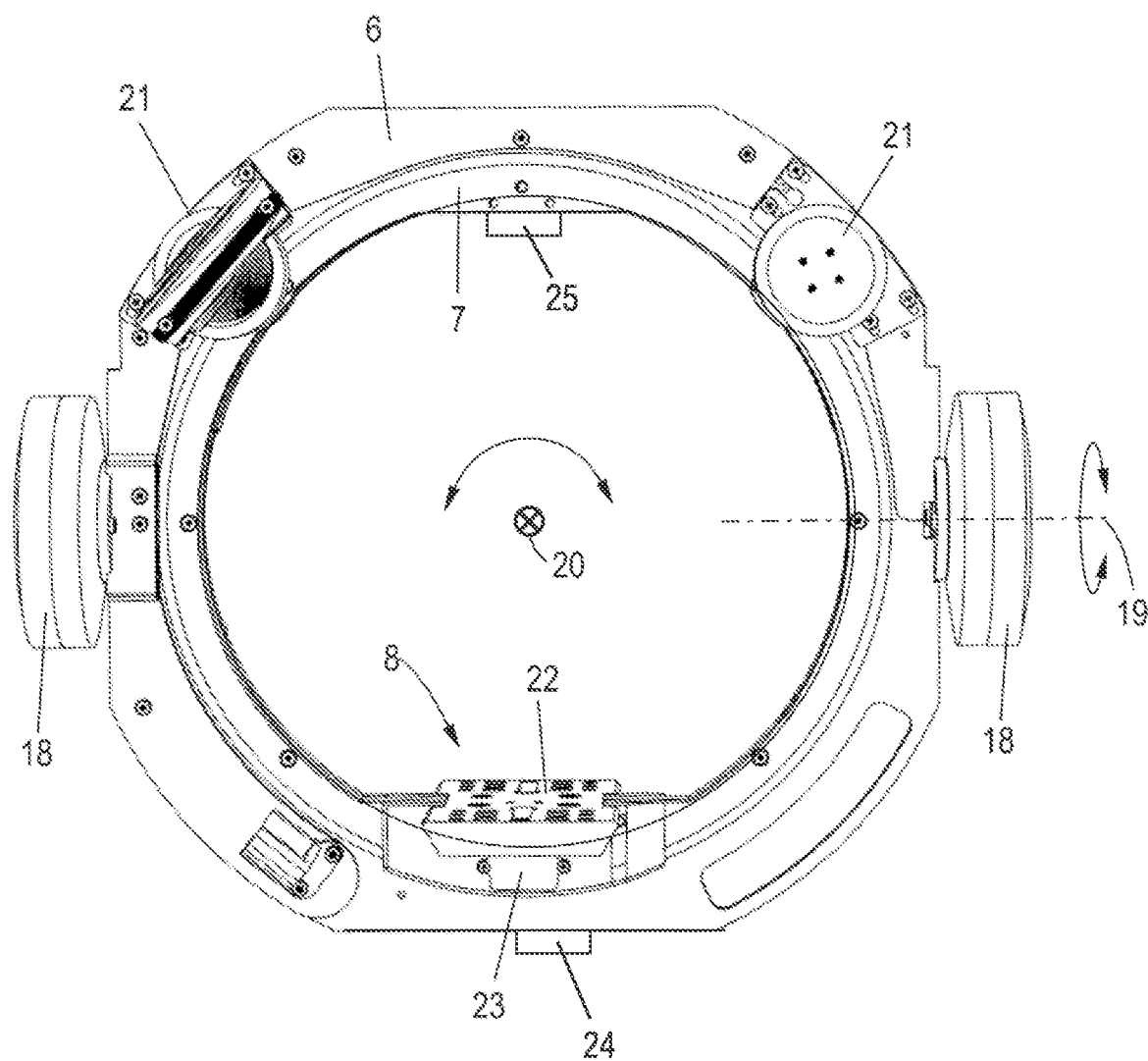
FIG. 3 shows a front view of parts of the camera stabilization arrangement according to FIG. 1.

FIGS. 2 and 3 further show the camera fastening device 8 which in the present case comprises a fastening plate 22 having different fastening possibilities. To achieve the positioning of the center of gravity 11 of the ring arrangement with the camera 9 at the center thereof, i.e. both on the roll axis 20 and on the tilt axis 19 which is perpendicular thereto, adjustment means 23 are furthermore indicated in FIG. 3 which permit an adjustment of the fastening plate 22 and thus of the camera 9 in three mutually perpendicular spatial directions. This may also be used to correctly adjust the center of gravity 16 of the camera stabilization arrangement 1 overall.

Furthermore, motion sensors 24, 25, 26 configured as acceleration sensors are arranged at the first ring element 6, the second ring element 7 and the holding frame 5, with which unwanted movements that can lead to a change in the alignment of the camera 9 and therefore to a deviation from a desired alignment may be detected.

Furthermore, a position sensor 27 is arranged at the underside of the support plate 15 of the holding frame 5, with which a rotational movement of the holding frame 5 relative to the pendulum arm 2 may be detected. In addition, an input device 28 (e.g. joystick) is arranged, for example, at the coupling device 3 of the pendulum arm 2 (FIG. 1) or at another location (for example, a remote control unit), with which user commands may be input for a desired driving of the camera holder 4 for an adjusting movement.

With regard to FIGS. 1 to 3, it should further be noted that the camera holder 4 has been conceptually distinguished from a support structure having the form of the pendulum arm 2. However, the pendulum arm 2 could also be regarded as part of the camera holder 4, in particular if a further controllable drive means (electric motor) is provided between the camera holder 4 and the pendulum arm 2.

Figure 4:
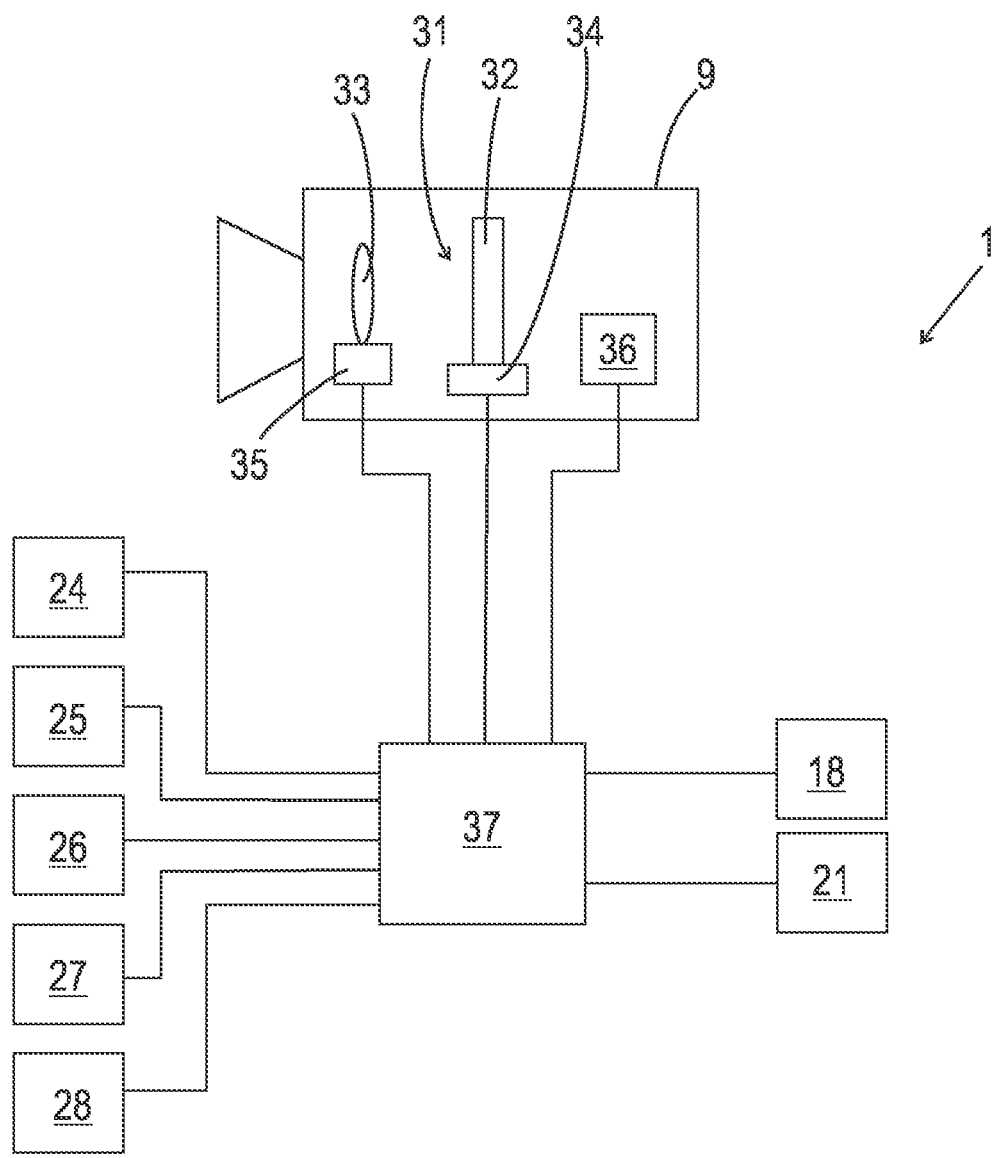
FIG. 4 shows a schematic representation of parts of the camera stabilization arrangement according to FIG. 1.

FIG. 4 shows a block diagram of parts of the camera stabilization arrangement 1. The camera stabilization arrangement 1 comprises an electric drive to drive the camera holder 4 (FIGS. 1 to 3) according to a plurality of degrees of freedom, wherein the electric drive comprises the drive means 18, 21 (e.g. electric motors) and optionally also further drive means for further degrees of freedom (e.g. rotation of the camera holder 4 relative to the pendulum arm 2). The camera stabilization arrangement 1 furthermore comprises the electronic camera 9, for example a motion picture camera, fastened to the camera holder 4 or the camera fastening device 8 (FIGS. 1 to 3). The camera 9 has an image capturing device 31 which comprises an image sensor 32, an optical component 33 (e.g. optical lens) upstream of the image sensor 32, optionally an image sensor drive device 34, and optionally an optical component drive device 35. Furthermore, the camera 9 may include a control unit 36 and a memory and an interface for outputting moving image data (not shown).

The camera stabilization arrangement 1 comprises furthermore the aforementioned motion sensors 24, 25, 26, which detect the movements of the elements of the camera holder 4 (holder frame 5 and ring elements 6, 7; FIGS. 1 to 3) and generate corresponding motion sensor signals. The camera stabilization arrangement 1 optionally further comprises the position sensor 27, which detects a relative movement between the holding frame 5 and the pendulum arm 2 and generates a corresponding position signal. The camera stabilization arrangement 1 optionally further comprises the input device 28. The camera stabilization arrangement 1 further comprises a control device 37 which receives the signals from the motion sensors 24, 25, 26 and the position sensor 27, as well as, the user commands input via the input device 28.

The control device 37 is configured to control the drive means 18, 21 in response to the motion sensor signals of the motion sensors 24, 25, 26 in order to perform a holder-side image stabilization, and/or to control the image capturing device 31 in order to perform a camera-side image stabilization, as explained in detail above for various embodiments. Due to the possibility to carry out holder-side image stabilization and camera-side image stabilization and to coordinate them with each other, it is possible to respond appropriately to various disturbing influences to the alignment of the camera 9 and/or to various states of the camera stabilization arrangement 1 in each case.

The holder-side image stabilization may in particular be brought about in that the control device 37 controls the drive means 18, 21 to compensating movements which counteract the detected movements. The camera-side image stabilization may in particular be brought about in that, the explained pixel shift is performed with respect to the reading-out of the image sensor 32, or that the control device 37 controls the image sensor drive means 34 to compensating movements of the image sensor 32 which counteract the influences of the detected movements, or in that the control device 37 controls the optical component drive means 35 to compensating movements of the optical component 33 which counteracts the influences of the detected movements. The control device 37 may control the image sensor drive device 34 and the optical component drive device 35 directly or via the control unit 36 of the camera 9.

As explained, the control device 37 may be configured in particular to distinguish between at least one holder-compensation-suitable type of detected movements and at least one holder-compensation-unsuitable type of detected movements and accordingly, to perform only selectively the holder-side image stabilization. As explained, the control device 37 may furthermore be configured in particular to perform only selectively the holder-side image stabilization and/or the camera-side image stabilization in dependence of a frequency of the detected movements, wherein a distinction may also be made, in particular, according to different directions of the detected movements. As explained, the control device 37 may furthermore be configured in particular to control the drive means 18, 21 in response to a user command received via the input device 28, in order to not only adjust a desired alignment of the camera holder 4 according to the user command, but also to suspend or modify the camera-side image stabilization. As explained, the control device 37 may furthermore be configured in particular to suspend or modify the camera-side image stabilization in response to the position signal from the position sensor 27. As explained, the control device 37 may furthermore be configured in particular to evaluate the motion sensor signals of the motion sensors 24, 25, 26 with regard to a predetermined movement pattern and to suspend or modify the holder-side image stabilization for an identified movement pattern.

LIST OF REFERENCE NUMERALS

1 camera stabilization arrangement
2 pendulum arm
3 coupling device
4 camera holder
5 holding frame
6 ring element
7 ring element
8 camera fastening device
9 camera
10 counterweight
11 center of gravity of ring arrangement 12 longitudinal axis of pendulum arm
13 center of gravity of counterweight
14 mass elements
15 support plate
16 center of gravity of camera stabilization arrangement
17 housing
18 drive means
19 tilt axis
20 roll axis
21 drive means
22 fastening plate
23 adjustment means
24 motion sensor
25 motion sensor
26 motion sensor
27 position sensor
28 input device
31 image capturing device
32 image sensor
33 optical component
34 image sensor drive device
35 optical component drive device
36 control unit for camera
37 control device for camera stabilization arrangement

The invention claimed is:

1. A camera stabilization arrangement, comprising:
a camera holder movable with respect to a plurality of degrees of freedom;
an electric drive configured to drive the camera holder in accordance with the plurality of degrees of freedom;
an electronic camera fastened to the camera holder, the electronic camera comprising an image capturing device having at least one image sensor for generating image sensor signals in dependence of incident light;
at least one motion sensor configured to detect movements of at least one of the camera holder or the camera for a plurality of directions and to generate corresponding motion sensor signals; and
a control device configured to control the electric drive in response to the motion sensor signals in order to perform a holder-side image stabilization, and to control the image capturing device in response to the motion sensor signals in order to perform a camera-side image stabilization,
wherein the control device is configured to perform the holder-side image stabilization for at least one of the plurality of directions only when a frequency of the detected movements is less than a first threshold value;
wherein the control device is configured to perform the camera-side image stabilization for the at least one of the plurality of directions only when the frequency of the detected movements is greater than a second threshold value, and
wherein the first threshold value and the second threshold value are identical.

2. A camera stabilization arrangement according to claim 1,
wherein the control device is configured to distinguish between at least one holder-compensation-suitable type of detected movements and at least one holder-compensation-unsuitable type of detected movements;
wherein the control device is configured to perform the holder-side image stabilization only for the at least one holder-compensation-suitable type of detected movements, but not for the at least one holder-compensation-unsuitable type of detected movements; and wherein the control device is configured to perform the camera-side image stabilization for the at least one holder-compensation-unsuitable type of detected movements.

3. A camera stabilization arrangement according to claim 2,
wherein the at least one holder-compensation-suitable type of detected movements includes a rotational movement, and/or wherein the at least one holder-compensation-unsuitable type of detected movements includes a translational movement.

4. A camera stabilization arrangement according to claim 2,
wherein the control device is configured to determine the at least one holder-compensation-unsuitable type of detected movements in dependence of at least one of a current position setting of the electric drive or a current alignment of the camera holder.

5. A camera stabilization arrangement according to claim 4,
wherein the control device is configured to variably assign the detected movements to a holder-compensation-suitable type or to a holder-compensation-unsuitable type in dependence of at least one of the current position setting of the electric drive or the current alignment of the camera holder, and to select at least one of the holder-side image stabilization or the camera-side image stabilization according to this assignment or to weigh the holder-side image stabilization and the camera-side image stabilization relative to one another according to this assignment.

6. A camera stabilization arrangement according to claim 1,
wherein the control device is configured to perform the holder-side image stabilization for different directions of the plurality of directions of movements in dependence of different first threshold values and/or to perform the camera-side image stabilization for different directions of the plurality of directions of movements in dependence of different second threshold values.

7. A camera stabilization arrangement according to claim 1,
furthermore comprising an input device configured to receive user commands for a desired movement of the camera holder; wherein the control device is configured to control the electric drive to change an alignment of the camera holder in response to a received user command; wherein the control device is furthermore configured to suspend or modify the camera-side image stabilization in response to the received user command.

8. A camera stabilization arrangement according to claim 1,
furthermore comprising at least one position sensor configured to generate a position signal which represents a change in position of the camera holder manually effected by the user;
wherein the control device is configured to suspend or modify the camera-side image stabilization in response to the position signal.

9. A camera stabilization arrangement according to claim 1,
wherein the image sensor is movably supported, wherein the image capturing device furthermore comprises an image sensor drive device, and wherein the control device is configured to control, in response to the motion sensor signals, the image sensor drive device to move the image sensor in order to perform the camera-side image stabilization.

10. A camera stabilization arrangement according to claim 1,
wherein the image capturing device furthermore comprises an optical component that is upstream of the image sensor and an optical component drive device, and wherein the control device is configured to control, in response to the motion sensor signals, the optical component drive device to move the optical component in order to perform the camera-side image stabilization.

11. A camera stabilization arrangement, comprising:
a camera holder movable with respect to a plurality of degrees of freedom;
an electric drive configured to drive the camera holder in accordance with the plurality of degrees of freedom;
an electronic camera fastened to the camera holder, the electronic camera comprising an image capturing device having at least one image sensor for generating image sensor signals in dependence of incident light;
at least one motion sensor configured to detect movements of at least one of the camera holder or the camera for a plurality of directions and to generate corresponding motion sensor signals; and
a control device configured to control the electric drive in response to the motion sensor signals in order to perform a holder-side image stabilization, and to control the image capturing device in response to the motion sensor signals in order to perform a camera-side image stabilization,
wherein the control device is configured to perform the holder-side image stabilization for at least one of the plurality of directions only when a frequency of the detected movements is less than a first threshold value,
wherein the control device is configured to perform the camera-side image stabilization for the at least one of the plurality of directions only when the frequency of the detected movements is greater than a second threshold value, and
wherein the first threshold value is less than the second threshold value, wherein the first threshold value and the second threshold value bound a transition frequency range in which the control device performs both the holder-side image stabilization and the camera-side image stabilization.

12. A camera stabilization arrangement according to claim 11,
wherein the control device is configured to distinguish between at least one holder-compensation-suitable type of detected movements and at least one holder-compensation-unsuitable type of detected movements; wherein the control device is configured to perform the holder-side image stabilization only for the at least one holder-compensation-suitable type of detected movements, but not for the at least one holder-compensation-unsuitable type of detected movements; and wherein the control device is configured to perform the camera-side image stabilization for the at least one holder-compensation-unsuitable type of detected movements.

13. A camera stabilization arrangement according to claim 11,
wherein the control device is configured to perform the holder-side image stabilization for different directions of the plurality of directions of movements in dependence of different first threshold values and/or to perform the camera-side image stabilization for different directions of the plurality of directions of movements in dependence of different second threshold values.

14. A camera stabilization arrangement according to claim 11,
furthermore comprising an input device configured to receive user commands for a desired movement of the camera holder; wherein the control device is configured to control the electric drive to change an alignment of the camera holder in response to a received user command; wherein the control device is furthermore configured to suspend or modify the camera-side image stabilization in response to the received user command.

15. A camera stabilization arrangement, comprising:
a camera holder movable with respect to a plurality of degrees of freedom;
an electric drive configured to drive the camera holder in accordance with the plurality of degrees of freedom;
an electronic camera fastened to the camera holder, the electronic camera comprising an image capturing device having at least one image sensor for generating image sensor signals in dependence of incident light;
at least one motion sensor configured to detect movements of at least one of the camera holder or the camera for a plurality of directions and to generate corresponding motion sensor signals; and
a control device configured to control the electric drive in response to the motion sensor signals in order to perform a holder-side image stabilization, and to control the image capturing device in response to the motion sensor signals in order to perform a camera-side image stabilization,
wherein the control device is configured to evaluate the motion sensor signals to identify a predetermined movement pattern of at least one of horizontal or vertical movements, wherein the control device is configured to suspend or modify the holder-side image stabilization for the identified movement pattern, and
wherein the control device is configured to categorize the motion sensor signals according to movement direction and movement speed and associated time durations, and to compare the movement directions, movement speeds and associated time durations with reference values of stored movement patterns.

16. A camera stabilization arrangement according to claim 15,
wherein the predetermined movement pattern corresponds to movements of a camera operator carrying the camera stabilization arrangement.

17. A camera stabilization arrangement according to claim 15,
wherein the predetermined movement pattern includes a horizontal pendulum movement which occurs for a walking movement of a camera operator carrying the camera stabilization arrangement.

18. A camera stabilization arrangement, comprising:
a camera holder movable with respect to a plurality of degrees of freedom;
an electric drive configured to drive the camera holder in accordance with the plurality of degrees of freedom;
an electronic camera fastened to the camera holder, the electronic camera comprising an image capturing device having at least one image sensor for generating image sensor signals in dependence of incident light;
at least one motion sensor configured to detect movements of at least one of the camera holder or the camera for a plurality of directions and to generate corresponding motion sensor signals; and
a control device configured to control the electric drive in response to the motion sensor signals in order to perform a holder-side image stabilization, and to control the image capturing device in response to the motion sensor signals in order to perform a camera-side image stabilization, wherein the control device is configured to evaluate the performed holder-side image stabilization or the performed camera-side image stabilization with respect to a quality grade of the image stabilization performed, to determine a corresponding quality grade and to output the quality grade to a user interface.

19. A camera stabilization arrangement, comprising:

a camera holder movable with respect to a plurality of degrees of freedom;

an electric drive configured to drive the camera holder in accordance with the plurality of degrees of freedom;

an electronic camera fastened to the camera holder, the electronic camera comprising an image capturing device having at least one image sensor for generating image sensor signals in dependence of incident light;

at least one motion sensor configured to detect movements of at least one of the camera holder or the camera for a plurality of directions and to generate corresponding motion sensor signals; and a control device configured to control the electric drive in response to the motion sensor signals in order to perform a holder-side image stabilization, and to control the image capturing device in response to the motion sensor signals in order to perform a camera-side image stabilization, wherein the camera is configured to output or to store moving image data during a recording of a moving image sequence, and wherein the control device is configured to assign, during the recording of the moving image sequence, at least one of information about the performed image stabilization or at least a part of the motion sensor signals as metadata to the moving image data.

20. A camera stabilization arrangement, comprising:

a camera holder movable with respect to a plurality of degrees of freedom;

an electric drive configured to drive the camera holder in accordance with the plurality of degrees of freedom;

an electronic camera fastened to the camera holder, the electronic camera comprising an image capturing device having at least one image sensor for generating image sensor signals in dependence of incident light;

at least one motion sensor configured to detect movements of at least one of the camera holder or the camera for a plurality of directions and to generate corresponding motion sensor signals; and a control device configured to control the electric drive in response to the motion sensor signals in order to perform a holder-side image stabilization, and to control the image capturing device in response to the motion sensor signals in order to perform a camera-side image stabilization, wherein the image sensor comprises a matrix of light-sensitive elements for generating the image sensor signals, wherein a first number of light-sensitive elements are intended for generating actually used image sensor signals, and wherein a second number of light-sensitive elements are not intended to be used for generating actually used image sensor signals; wherein an assignment of the light-sensitive elements to the first number or the second number is variable for at least a part of the light-sensitive elements; wherein the control device is configured to vary the assignment of the light-sensitive elements to the first number or the second number in response to the motion sensor signals, in order to perform the camera-side image stabilization.

* * * * *